Nov. 4, 1969    D. E. HARVEY ET AL    3,476,965
INTERCONNECTED BRUSH SPRING AND TERMINAL
Filed May 1, 1968    2 Sheets-Sheet 1
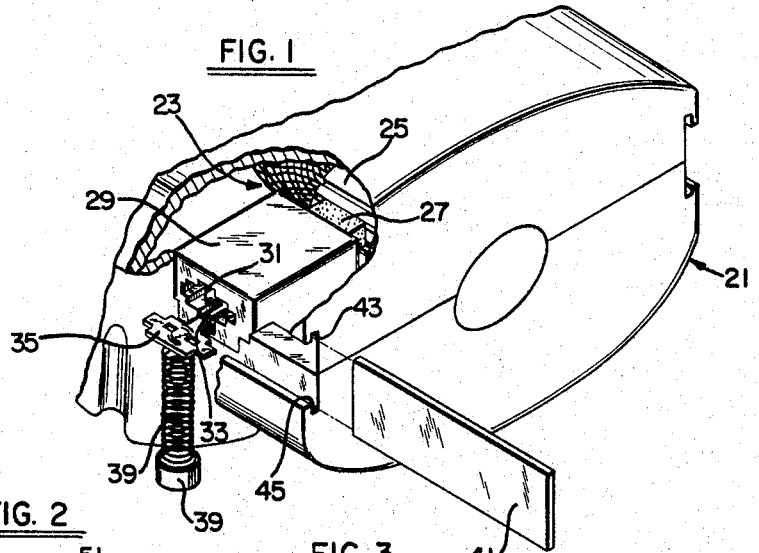
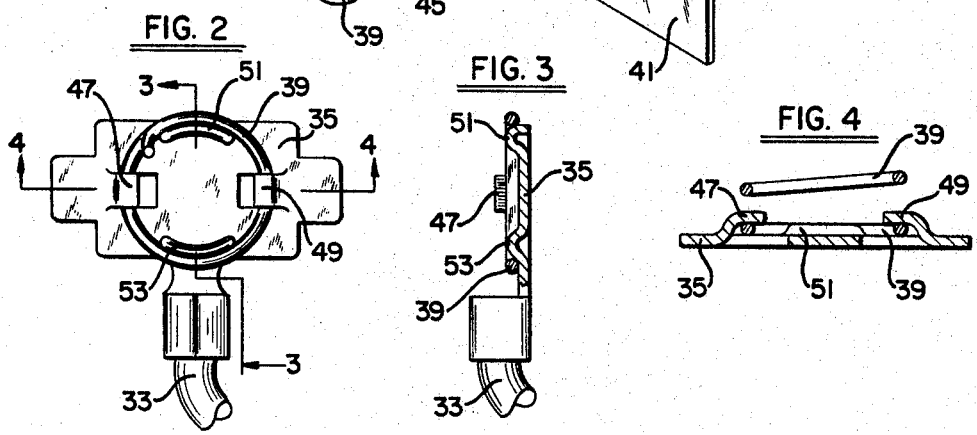
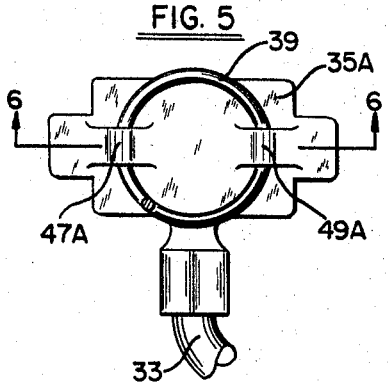
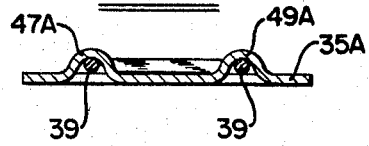
INVENTORS
DAVID E. HARVEY
CARL J. AMREIN
SALVATORE R. ABBRATOZZATO
BY Joseph R. Slotnick
ATTORNEY

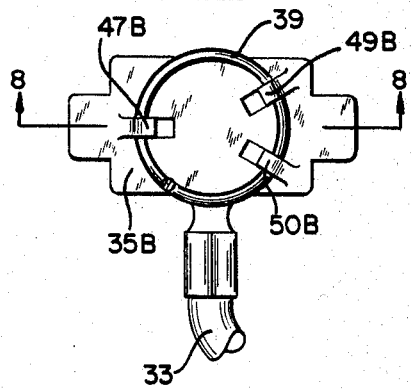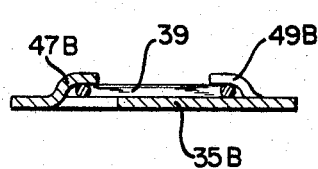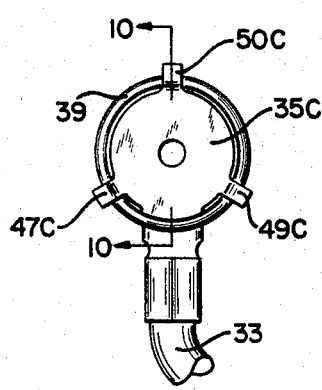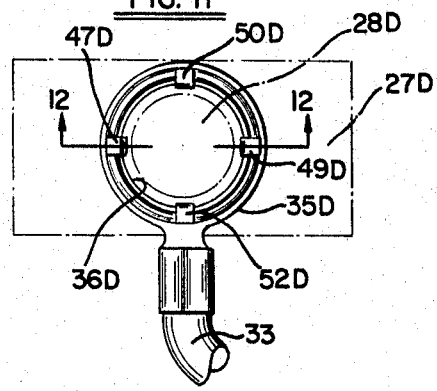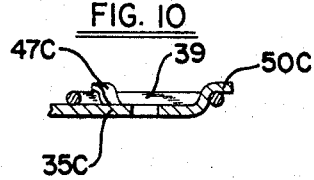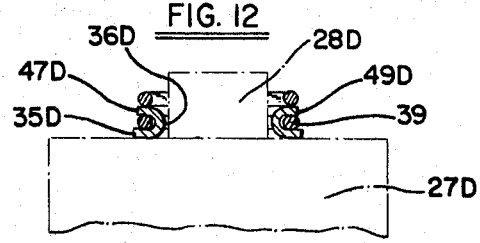

United States Patent Office 3,476,965
Patented Nov. 4, 1969

3,476,965
INTERCONNECTED BRUSH SPRING AND TERMINAL
David E. Harvey and Carl J. Amrein, Baltimore, and Salvatore R. Abbratozzato, Towson, Md., assignors to The Black and Decker Manufacturing Company, Towson, Md., a corporation of Maryland
Filed May 1, 1968, Ser. No. 725,654
Int. Cl. H01r 39/36
U.S. Cl. 310—249                    18 Claims

ABSTRACT OF THE DISCLOSURE

The device disclosed herein is a brush assembly for use in an electric motor or motor device and includes a brush holder fixed on a motor housing and adapted to have a carbon brush slidably disposed therein. An electrical lead has a terminal disposed within the brush holder behind the brush and is biased thereagainst by a compression spring also within the holder and behind the terminal. The lead and spring are novelly interlocked so as to facilitate easy removal of the terminal from the holder pursuant to brush inspection and/or replacement.

SUMMARY OF THE INVENTION

The present invention is directed specifically to the novel construction, in an electric motor brush assembly, wherein an electric lead terminal is held in engagement with a carbon brush and the latter is biased outwardly in one end of a brush holder by a compression spring, and wherein the spring is interlocked with the terminal. This is advantageous particularly in those installations wherein it is desirable that the brush assembly be serviceable from outside the motor housing. There, the brush holder may have its outer end closed or covered by means removable from outside the housing. Once this means is removed, the spring comes at least partially out of the holder whereupon it serves as a handle for removing the terminal and exposing the brush. Thus, no special tools are required to remove the terminal and the whole assembly (and disassembly) sequence is greatly simplified.

Main objects of the present invention, therefore, are to provide an improved brush assembly for use in an electric motor which facilitates easy removal of the assembly components pursuant to brush inspection and/or replacement, and which obviates the need for special tools to perform this task.

Further important objects of the present invention are to provide an improved brush assembly of the above character which is particularly adapted for use in installations where it is desirable that the brushes be inspected and/or replaced from outside the motor housing, and which greatly simplifies the whole process of assembling and disassembling the brush assembly.

Additional objects are to provide an improved assembly of the above character which is relatively inexpensive to manufacture, rugged in construction and reliable in use.

Other objects and advantages of the present invention will become more apparent from a consideration of the detailed description to follow taken in conjunction with the drawings annexed hereto.

DESCRIPTION OF THE DRAWINGS

FIG. 1 is an exploded perspective view illustrating a brush assembly embodying a preferred form of the present invention and shown with an externally accessible brush holder in position on an electric motor housing;

FIG. 2 is an enlarged plan view of the interconnected brush spring and terminal of FIG. 1;

FIG. 3 is a sectional view of FIG. 2 taken along the line 3—3 thereof;

FIG. 4 is a sectional view of FIG. 2 taken along the line 4—4 thereof;

FIG. 5 is a view similar to FIG. 2 but showing a modified form of the invention;

FIG. 6 is a sectional view of FIG. 5 taken along the line 6—6 thereof;

FIG. 7 is a view similar to FIGS. 2 and 5 and showing still another modified form of the invention;

FIG. 8 is a sectional view of FIG. 7 taken along the line 8—8 thereof;

FIG. 9 is a view similar to FIGS. 2, 5 and 7 and showing still another modified form of the invention;

FIG. 10 is a sectional view of FIG. 9 taken along the line 10—10 thereof;

FIG. 11 is a view similar to FIGS. 2, 5, 7 and 9 and showing yet another modified form of the present invention; and FIG. 12 is a sectional view of FIG. 11 taken along the line 12—12 thereof.

BROAD STATEMENT OF THE INVENTION

Broadly described, the present invention relates to an electric motor brush assembly comprising a brush holder having a passage therethrough, a carbon brush slidably disposed in said passage and adapted to extend outwardly of one end thereof, a compression spring caged within said passage behind said brush, and electrical lead means including a terminal disposed within said passage between said spring and said brush, said terminal having spaced means interlocked with said spring, whereby said terminal is removed from said passage with removal of said spring therefrom.

In another aspect, the present invention includes a brush assembly comprising a brush holder be fixedly supported upon a housing and having a passage therethrough with one end thereof opening outside said housing, means adapted to cover said opening at said brush holder one end and removable from said brush holder from outside said housing, a brush slidably disposed in said passage, electrical lead means including a terminal slidable within said passage behind and engaging said brush, compression spring means within said passage between said brush and said cover, means defining at least one opening in said terminal receiving at least a portion of one of the coils of said spring to interlock one end of said spring to said terminal, whereby said lead is withdrawn from said passage upon removal of said cover and withdrawal of said spring, whereby to facilitate inspection of said brush from outside of said housing.

In still another aspect, the present invention relates to an interconnected brush terminal and spring for use in an electric motor comprising a conductive terminal fixed to an electrical lead and having spaced projections formed integral therewith, an elongated compression spring having at least the last coil at one end thereof interlocked with said spaced projections, whereby said spring forms a handle for said terminal.

DETAILED DESCRIPTION

Referring now more specifically to the drawings, a preferred form of the present invention is illustrated in FIGS. 1–4. Thus, as shown in FIG. 1, an electric motor device in which the present invention finds use is seen to include a housing 21 having an electric motor 23 supported therein. The motor 23 includes a rotatable commutator 25 energized through a pair of carbon brushes 27 (only one of which is shown) and which are carried by a brush holder 29. Each of the brush holders 29 (only one of which is shown) is fixed upon the housing 21 (as by being trapped between mating halves thereof) and has a passage 31 therethrough in which brush 27 is adapted to slide. Electric current is transmitted to each brush 27 by an electrical lead 33 (only one of which is shown) which has a conductive terminal 35 shaped generally complementary to and slidable within the passage 31 behind and in engagement with the brush 27. A compression spring 39 is also positioned in the passage 31 and holds the terminal 35 in engagement with the brush 27 and the latter against the commutator 25. The spring 39 is backed-up by a cover 41 adapted to slidably fit in slots 43, 45 formed in the housing 21. Thus, when in position within the slots 43, 45, the cover 41 overlays the passage 31 and holds the brush spring 39, the terminal 35 and and brush 27 in place within the brush holder 29. However, when the cover 41 is removed from the slots 43, 45, as shown in FIG. 1, the spring 39, the terminal 35 and, if necessary, the brush 27 may be removed from the holder 29 from outside the housing 21. In order to prevent damage to the spring 39 during assembly and removal of the cover 41, i.e. to prevent the outermost spring coils from being "wiped" or deflected laterally as the cover 41 moves laterally thereof, a protective cap 47 may be provided on the spring 39 at its outer end.

During use, the brushes 27 wear so that it becomes necessary to inspect and sometimes replace them. As pointed out above, the construction of the brush holder 29 and the removable cover 41 allows inspection and/or replacement of the brushes from outside the housing 21. However, heretofore, special tools had to be employed to facilitate removal of the terminal 35 from the brush holder passage 31 in order to render the brush 27 accessible. Even at that, the terminal 35 sometimes could not be removed so that oftentimes the housing 21 had to be disassembled and the brush holder 29 removed to gain access to the brush 27. The present invention obviates the need for special tools to remove the terminal 35 in a simple, inexpensive and novel manner and makes the terminal easily removable from the brush holder passage 31. In fact, the present invention makes the entire assembly and disassembly processes for the brush assembly components easier.

As shown in FIGS. 2–4, the terminal 35 has a pair of spaced, raised tabs 47, 49 struck-out therefrom and which are adapted to receive and hold at least the endmost coil of the spring 39 at substantially diametrically opposed positions thereof. If desired, a pair of raised portions or protuberances 51, 53 are disposed opposite the tabs 47, 49 and are adapted to engage within the endmost coil of the spring 39 at diametrically opposed positions and prevent this coil from pulling laterally out of the tabs 47, 49 so that when this spring coil is in the position shown in FIGS. 2–4, the terminal 35 is fixed to the spring 39. Thus, when the cover 41 is removed from the housing slots 43, 45, the compression spring 39 is at least partially ejected from the brush holder passage 31 and the spring 39 may then be used in the nature of a handle to withdraw the terminal 35 from the passage 31. The lead 33 extends through a slot 55 in the side of the brush holder 29 so that when the terminal 35 is pulled out of the passage 31 (using the spring 39 as a handle), the lead 33 lays back in the slot 55 and permits unobstructed inspection and/or replacement of the brush 27.

When the lead 35 is to be reinserted into the brush holder passage 31, the spring 39, again serving as a handle, is used to push the lead 35 through the passage 31. Then, while holding the spring 39 compressed, the cover 41 is slid back in place within the slots 43, 45. It will be understood, however, that the particular cover 41 illustrated is exemplary only and that other covers, including ones which are otherwise fastened to the housing 21, or ones which screw on or into the brush holder 29, or those which snap or slide on, for example, may be used instead of the slide cover 41. In general, however, it will be appreciated that this interconnected spring 39 and terminal 35 facilitates easy insertion and removal of the terminal 35 to and from the brush holder passage 31 pursuant to brush inspection and/or replacement without the need for special tools or without requiring removal of the brush holder 29 and/or disassembly of the housing 21.

The spring 39 is easily attached to the terminal 35 by sliding the endmost spring coil laterally under the tabs 47, 49 and, by means of the flexible nature of the spring 39, causing this coil to cam over the forwardmost one of the projections 51, 53 in the direction the spring coil is slid. In the embodiment illustrated in FIGS. 2–4, the spring coil would need be moved toward the projection 53 because of the position of the lead 33, or downwardly as seen in FIGS. 2 and 3, so that this coil would flex and cam over the projection 53. Should it be desired to detach the spring 39 and terminal 35, the end most coil is first lifted over the projection 53 (for example by using a screw driver) and then slid upwardly as seen in FIGS. 2 and 3, and clear of the tabs 47, 49.

The embodiment shown in FIGS. 5 and 6 differs from that of FIGS. 1–4 in that here, the terminal 35A has a pair of spaced, punched out tabs forming a pair of loops 47A, 49A. The endmost coil of the spring 39 is threaded through the loops 47A, 49A as shown so that this coil is securely held to the terminal 35A and is prevented from moving laterally relative thereto. Thus, like the embodiment of FIGS. 1–4, the spring 39 may be used in the nature of a handle for removing the terminal 35A from its brush holder passage or for reinserting the same.

The embodiment of FIGS. 7 and 8 employs three raised tabs 47B, 49B, 50B, which are struck out of the terminal 35B. The three tabs 47B, 49B, 50B hold the endmost spring coil securely attached to the terminal 35B. To assemble the spring 39 or to disassemble it from the terminal 35B, the endmost coil can be threaded into or out of engagement with the tabs 47B, 49B, 50B or alternatively, this coil can be squeezed together or flexed and slid laterally under these tabs.

In the embodiment of FIGS. 9 and 10, the termnial 35C is provided with three outwardly extending tabs 47C, 49C, 50C at substantially equidistant positions therearound. Here, the spring coil can be threaded into or out of engagement with the tabs 47C, 49C, 50C, or this spring coil can be stretched thereover. Unlike the other embodiments, however, the spring coil in FIGS. 9 and 10 is not trapped between the tabs and the terminal; rather, the tabs 47C, 49C, 50C are trapped between two spring coils. In any event, the spring 39 is secured to the terminal 35C and serves as a handle therefor.

FIGS. 11 and 12 illustrate an embodiment adapted for use with a necked brush. This brush 27D is provided with a rearwardly projecting neck 28D and the terminal 35D is centrally apertured at 36D to fit over the neck 28D. A plurality of tabs 47D, 49D, 50D, 52D are formed integrally with the terminal 35D and extend upwardly and outwardly from adjacent the central aperture 36D. Again, the endmost coil of the spring 39 can be threaded on or unthreaded from the tabs 47D, 49D, 50D, 52D or this coil can be stretched over the tabs. Again, the spring 39 is secured to the terminal 35D and serves as a handle therefor.

By the foregoing, there has been disclosed a novel, interconnected brush spring and terminal construction for use in an electric motor calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

We claim:

1. An electric motor brush assembly comprising a brush holder having a passage therethrough, a carbon brush slidably disposed in said passage and adapted to extend outwardly of one end thereof, a compression spring caged within said passage behind said brush, and electrical lead means including a terminal disposed within said passage between said spring and said brush, said terminal having spaced means interlocked with said spring, whereby said terminal is removed from said passage with removal of said spring therefrom.

2. An assembly as defined in claim 1 wherein said terminal is provided with integral projections adapted to hold and locate at least the endmost coil of said spring securely thereto.

3. An assembly as defined in claim 2 wherein said projections comprise a pair of spaced tabs struck upwardly from said terminal and spaced apart a distance substantially equal to the outside diameter of said spring.

4. An assembly as defined in claim 3 wherein said tabs are spaced from said terminal a distance substantially equal to the wire thickness of said spring.

5. An assembly as defined in claim 2 wherein said projections comprise loops punched upwardly of said terminal.

6. An assembly as defined in claim 2 wherein said projections comprise at least two tabs struck upwardly from said terminal.

7. An assembly as defined in claim 2 wherein said projections comprise at least two tabs extending radially outwardly from said terminal.

8. An assembly as defined in claim 2 wherein said terminal is centrally apertured to fit over a neck on said brush, said projections comprising tabs on said terminal extending radially outwardly of said aperture.

9. A brush assembly comprising a brush holder fixedly supported upon a housing and having a passage therethrough with one end thereof opening outside said housing, means adapted to cover said opening at said brush holder one end and removable from said brush holder from outside said housing, a brush slidably disposed in said passage, electrical lead means including a terminal slidable within said passage behind and engaging said brush, compression spring means within said passage between said brush and said cover, means defining at least one opening in said terminal receiving at least a portion of one of the coils of said spring to interlock one end of said spring to said terminal, whereby said lead is withdrawn from said passage upon removal of said cover and withdrawal of said spring, whereby to facilitate inspection of said brush from outside said housing.

10. An assembly as defined in claim 9 wherein said opening defining interlocking means comprises a plurality of loops struck upwardly from said terminal and spaced therefrom a distance to snugly receive and hold the endmost coil of said spring against said terminal.

11. An assembly as defined in claim 1 wherein said interlocking means further comprises means independent of said tabs for holding said coil against lateral movement relative to said terminal.

12. An assembly as defined in claim 1 wherein said interlocking means comprises tabs deformed upwardly and laterally of said terminal and adapted to receive and retain at least one spring coil between said tabs and said terminal.

13. An assembly as defined in claim 12 wherein said terminal is centrally apertured to receive a neck on said brush.

14. An interconnected brush terminal and spring for use in an electric motor comprising a conductive terminal fixed to an electrical lead and having spaced projections formed integral therewith, an elongated compression spring having at least the last coil at one end thereof interlocked with said spaced projections, whereby said spring forms a handle for said terminal.

15. A construction as defined in claim 14 wherein said projections include a plurality of tabs struck upwardly from said terminal and adapted to have at least one coil of said spring trapped therebeneath.

16. A construction as defined in claim 15 wherein said projections further include means for holding said spring coil against lateral movement relative to said terminal.

17. A construction as defined in claim 14 wherein said projections include tabs deformed upwardly and laterally of said terminal and adapted to hold at least one spring coil securely against said terminal.

18. A construction as defined in claim 14 wherein said projections comprise loops extending upwardly from said terminal and adapted to have at least one coil of said spring threaded therein.

References Cited

UNITED STATES PATENTS

| | | | |
|---|---|---|---|
| 3,339,098 | 8/1967 | Burrows et al. | 310—247 |
| 3,212,041 | 10/1965 | Dixon | 310—242 |
| 2,987,639 | 6/1961 | Bayless et al. | 310—247 |
| 3,138,728 | 6/1964 | Videtic | 310—239 |

MILTON O. HIRSHFIELD, Primary Examiner

G. P. TOLIN, Assistant Examiner

U.S. Cl. X.R.

310—247